Figure 1:
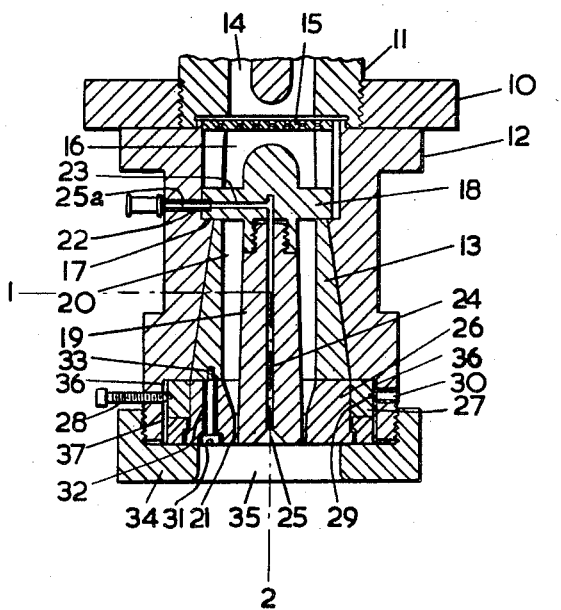

March 8, 1955  J. ALLAN ET AL  2,703,434

EXTRUSION

Filed July 25, 1952

J. ALLAN
A. STEPHENS
D. W. BROWNE
INVENTORS

ATTORNEYS

United States Patent Office 2,703,434
Patented Mar. 8, 1955

2,703,434

EXTRUSION

John Allan, Alexander Stephens, and Denis Wheeler Browne, Wrexham, England, assignors to British Celanese Limited, a corporation of Great Britain Application July 25, 1952, Serial No. 300,922

Claims priority, application Great Britain August 2, 1951

1 Claim. (Cl. 18—14)

This invention relates to extrusion and is particularly concerned with the provision of an improved die-head for the hot extrusion of tubes of thermoplastic material.

In making tubes of plasticised cellulose acetate or other thermoplastic material which is substantially rigid at normal atmospheric temperatures, by hot extrusion of the thermoplastic material in the absence of volatile liquids, an annular die is used comprising a tubular die-block surrounding a central core, the material being extruded through the annular aperture between this core and the die-aperture. The core which is supported at its rear end only, is carried by a spider which bridges the passage through which the material is forced by the extruder. This spider is held in a tubular die holder which also supports the die-block. In order that irregularities in flow due to the obstruction caused by the spider shall be substantially eliminated by the time the die aperture is reached the spider is located some distance behind that aperture. The core is usually provided with an internal passage through which a stream of air, introduced through a corresponding passage in the spider can be passed into the tube emerging from the die to prevent it collapsing while still highly plastic. Auxiliary heating means associated with the die holder are usually provided for ensuring that the material is at the desired temperature immediately before emerging from the die aperture. To obtain the best results it has been found necessary to be able to adjust the centring of the die-block about the axis of the core during extrusion and for this purpose the die holder is provided with a number (e. g. 4 or 6) set screws symmetrically arranged and projecting radially inwards into contact with the outer surface of the die-block. An internally flanged nut having a flared opening to admit the extruded tube is screwed on to the front of the die holder.

In making tubes by the hot solvent-less extrusion of plasticised cellulose acetate by means of a screw extruder provided with a die of the kind described above we have found that after running for some time certain superficial blemishes, e. g. bright streaks, heavy lines and dark spots, develop on the extruded tube. Careful observation during very prolonged runs with variation of running conditions led to the discovery that these imperfections are caused by a minute quantity of the thermoplastic material seeping slowly into the space between the die-block and the die holder, where the material gradually becomes degraded until its viscosity is sufficiently low to enable it to flow on to the extruded tube. All attempts to avoid this trouble by very careful assembly and tightening up of the die assembly were fruitless. Sooner or later during a prolonged run the faults in the tube appeared. According to the present inventions means are provided intercepting and removing any such degraded material before it can reach the extruded tube.

Preferably the improved die-head of the invention is of the general construction described above, but the outer surface of the die-block is provided with a peripheral groove at a little distance behind the die aperture and this groove communicates at its lowest point (assuming extrusion to be horizontal) with a downwardly directed passage through the die holder, which serves to carry the degraded material away. In operation this groove intercepts any material that has seeped through the space between the die-block and the die holder and prevents it reaching the extruded tube. The flow of the material through the drain passage in the die holder is preferably by gravity. A plurality of peripheral grooves in the outer surface of the die-block may be provided each communicating with outlet means in the die holder, but a single passage has been found effective. The peripheral groove (or one of such grooves where there are more than one) is preferably in line with the ends of the centring set screws, which may bridge the groove, or, provided that the groove be made wide enough for ample clearance round the screws, may enter the groove and abut against its inner surface.

Figure 2:
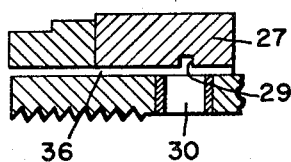

In the accompanying diagrammatic sectional drawing Fig. 1 shows by way of example an extrusion head, for horizontal extrusion, according to the invention, and Fig. 2 is a detail view, on an enlarged scale, of a portion of the extrusion head shown in Fig. 1.

In the drawing the section above the line marked 1 and to the right of the line marked 2 is taken in a vertical plane through the longitudinal axis of the head; the section below the line 1 and to the left of the line 2 is taken in a horizontal plane through said axis.

To the front flange 10 of the screw extruder 11 the die holder 12 having a liner 13 is bolted so that the cylinder space 14 communicates through the filter assembly 15 with the space 16 within the die holder. (A hinged mounting for the die-head is preferably provided so that it may be swung bodily away from the front of the extruder.) On the shoulder 22 rests the bridge-piece 18 supporting the core 19. The bridge-piece is in the form of a spider. The apertures between the arms of the spider (not shown) connect the space 16 with the space 20 through which the thermoplastic material passes to the die aperture 21. An air-passage 22 through the die holder communicates by a passage 23 in the bridge-piece with a passage 24 in the core, having a flared outlet 25. An air pipe 25a fits into the passage 22 and provides an air stream issuing from the outlet 25.

Surrounding the forward end of the core 19 is the die-block consisting of a die 26 provided with a collar 27. The die-block is centred about the core 19 by adjustment of six set screws 28 (of which one is shown), the screws being radially and symmetrically disposed about the longitudinal axis of the head, each screw working in a threaded bore in the die holder 12 through which it projects to engage the collar 27. In the collar 27 is a circumferential groove 29. The set screws 28 project into the groove and abut against its inner surface. The groove communicates at its lowest point with a vertical downward drain passage 30 through the die holder. Six clamping screws 31 (of which one is shown) are provided for clamping the die-block in position after adjustment of the set screws 28. Each clamping screw 31 passes through a plain bore 32 of larger diameter than the screw and engages a threaded bore 33 in the liner 13. To the front of the die holder is screwed an internally flanged retaining nut 34 having a flared opening 35 for the material extruded from the die aperture 21.

In operation, thermoplastic material is forced by the screw extruder from the space 14 through the filter assembly 15 into the space 16, thence through the apertures between the arms of the bridge-piece 18 into the space 20 whence it is extruded as a tube through the die aperture 21. The extruded tube is continuously drawn off and cooled by means not shown. Air is continually supplied through the airpipe 25a and passages 23 and 24 to the outlet 25, where it emerges into the interior of the extruded tube. Any thermoplastic material that seeps into the annular space 36 between the collar 27 and the inner wall 37 of the die holder 12 is trapped in the groove 29 from which it drains away by the drain passage 30.

As indicated above, the channel for intercepting the seeping material is preferably a peripheral groove or grooves in the collar of the die-block. Alternatively or in addition, however, a groove or grooves can be provided round the inner surface of the die holder, out of line with, and preferably in front of, the line of contact of the centring set screws.

The die-head of the invention has been found particularly suitable for the hot, solvent-less extrusion of tubes of plasticised cellulose acetate. Similarly it may be used for the extrusion of other plasticised cellulose derivatives, for example other cellulose esters derived from fatty acids containing 2 to 4 carbon atoms such as cellulose propionate, cellulose acetate-propionate and cellulose acetate-butyrate, and cellulose ethers such as ethyl cellulose. Other thermoplastic materials that can be extruded similarly include polystyrene, polyethylene and other thermoplastic polymerised unsaturated substances, e. g. copolymers of vinyl chloride with a minor proportion of vinyl acetate, of vinylidene chloride with a minor proportion of vinyl chloride, and of acrylonitrile or methacrylonitrile with vinyl and/or vinylidene chloride. Thermoplastic condensation polymers such as nylons, polyethylene terephthalate and poly-4-amino-1.2.4-triazole can also be used.

The invention has been described with reference to extrusion by means of a screw extruder, but the die of the invention can also be used with other forms of extruder, for example with a ram extruder.

Having described our invention what we desire to secure by Letters Patent is:

A die-head suitable for the hot extrusion of thermoplastic material, said die-head comprising a tubular die holder, a core supported within the tubular space of the die holder, a die-block within said space and surrounding the core, the outside diameter of the die-block being less than that of the space within the die holder in which the die-block is accommodated said die holder having a flat surface against which a flat surface of the die block abuts, means fixedly securing said die block to said die holder with their flat surfaces in abutment, and means being provided for centring the die-block about the core and holding it in position, the die-block having a peripheral groove for trapping any thermoplastic material seeping forward over the outer surface of the die-block within the annular space between said block and the inner surface of the die holder, and, for carrying off material trapped by said groove, a drain passage extending downwards through the die holder, said passage opening out of the annular space between the die-block and the die holder opposite the lowest point of the groove.

References Cited in the file of this patent

UNITED STATES PATENTS

| | | |
|---|---|---|
| 2,210,004 | Rautenstrauch | Aug. 6, 1940 |
| 2,465,482 | Rhodes | Mar. 29, 1949 |
| 2,565,522 | Renier | Aug. 28, 1951 |